US010829278B2

(12) United States Patent
Kegelman et al.

(10) Patent No.: US 10,829,278 B2
(45) Date of Patent: Nov. 10, 2020

(54) REMOVABLE CAP WITH SEAL DESIGNED TO BE OPENED BY PIERCING IN A DIAGNOSTIC ANALYZER

(71) Applicant: Siemens Healthcare Diagnostics Inc., Tarrytown, NY (US)

(72) Inventors: James W. Kegelman, Wilmington, DE (US); Joseph E. Brennan, Newark, DE (US); William E. Hudson, Bear, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/308,798

(22) PCT Filed: Jun. 22, 2017

(86) PCT No.: PCT/US2017/038864
§ 371 (c)(1),
(2) Date: Dec. 10, 2018

(87) PCT Pub. No.: WO2018/005241
PCT Pub. Date: Jan. 4, 2018

(65) Prior Publication Data
US 2019/0144177 A1 May 16, 2019

Related U.S. Application Data

(60) Provisional application No. 62/357,912, filed on Jul. 1, 2016.

(51) Int. Cl.
| B65D 51/00 | (2006.01) |
| B29C 65/36 | (2006.01) |
| B29C 65/00 | (2006.01) |
| B65D 1/04 | (2006.01) |
(Continued)

(52) U.S. Cl.
CPC ............ *B65D 51/002* (2013.01); *B01L 3/523* (2013.01); *B29C 65/368* (2013.01);
(Continued)

(58) Field of Classification Search
CPC ......... B65D 51/002; B65D 1/04; B01L 3/523; B01L 2300/0887; B01L 2300/044;
(Continued)

(56) References Cited

U.S. PATENT DOCUMENTS

| 4,652,429 A * | 3/1987 | Konrad ................ B65D 51/002 |
| | | 215/249 |
| 5,230,427 A | 7/1993 | Betts et al. |

(Continued)

FOREIGN PATENT DOCUMENTS

| JP | H05-196560 A | 8/1993 |
| JP | 2002-544076 A | 12/2002 |
(Continued)

OTHER PUBLICATIONS

Extended EP Search Report dated Apr. 5, 2019 of corresponding European Application No. 17820968.0, 5 Pages.
(Continued)

*Primary Examiner* — James N Smalley (57) ABSTRACT

Embodiments are directed to a removable cap with a conduction seal closure for sealing an opening of a container. The cap has a side wall and a top wall with an open access hole there-through. A flat upper portion surrounds the open access hole, which is sealed by the conduction seal. The conduction seal comprises a first polymer sealing layer, an aluminum foil layer on top of the first layer to heat seal the first layer to the cap, and a second polymer layer arranged on top of the aluminum foil layer for protection. The aluminum foil provides a formable shaping strength such that upon seal piercing, a permanent memory spread of the
(Continued)

first and third layers is achieved. Removal of the cap does not damage the seal. Access to the container contents is achieved without probe contact to the as-pierced seal.

18 Claims, 6 Drawing Sheets

(51) Int. Cl.
  *B01L 3/00* (2006.01)
  *B29L 31/56* (2006.01)
  *B29K 705/02* (2006.01)
(52) U.S. Cl.
  CPC ...... *B29C 65/3656* (2013.01); *B29C 66/1122* (2013.01); *B29C 66/24221* (2013.01); *B29C 66/53461* (2013.01); *B29C 66/72321* (2013.01); *B65D 1/04* (2013.01); *B01L 2200/0689* (2013.01); *B01L 2300/044* (2013.01); *B01L 2300/0887* (2013.01); *B29C 66/71* (2013.01); *B29K 2705/02* (2013.01); *B29L 2031/565* (2013.01)
(58) Field of Classification Search
  CPC ....... B01L 2200/0689; B29C 66/72321; B29C 66/53461; B29C 66/24221; B29C 66/1122; B29C 65/368; B29C 65/3656; B29C 66/71; B29K 2705/02; B29L 2031/565
  See application file for complete search history.

(56) References Cited

U.S. PATENT DOCUMENTS

| | | | |
|---|---|---|---|
| 5,381,913 A | 1/1995 | Peeters | |
| 10,627,417 B2 | 4/2020 | Brennan et al. | |
| 2001/0039058 A1 | 11/2001 | Iheme et al. | |
| 2002/0079284 A1 | 6/2002 | Carano | |
| 2002/0127147 A1 | 9/2002 | Kacian et al. | |
| 2003/0052074 A1* | 3/2003 | Chang | B01L 3/50825 215/247 |
| 2006/0124577 A1 | 6/2006 | Ross et al. | |
| 2006/0226113 A1* | 10/2006 | Clark | B01L 3/50825 215/247 |
| 2007/0034592 A1* | 2/2007 | Pavlovic | B01L 3/50825 215/253 |
| 2008/0029540 A1 | 2/2008 | Johnson | |
| 2010/0111772 A1* | 5/2010 | Hartofelis | B01L 3/523 422/400 |
| 2011/0120998 A1 | 5/2011 | Brauer | |
| 2013/0032565 A1 | 2/2013 | Fox | |
| 2014/0053662 A9 | 2/2014 | Kacian | |
| 2015/0166234 A1 | 6/2015 | Wei | |
| 2016/0003861 A1 | 1/2016 | Brennan et al. | |

FOREIGN PATENT DOCUMENTS

| | | |
|---|---|---|
| WO | 2015/069546 A2 | 5/2015 |
| WO | 2016/038357 A1 | 3/2016 |
| WO | 2016/066983 A1 | 5/2016 |
| WO | 2018/005239 A1 | 1/2018 |

OTHER PUBLICATIONS

PCT International Search Report and Written Opinion dated Sep. 15, 2017 (11 Pages).
'Nylon or Polypropylene in Synthetic Turf' (Zeager Bros Inc) Apr. 17, 2016. Retrieved from the Internet on Aug. 24, 2017. URL: <http://www.zeager.com/content/uploads/2016/04/Nylon-vs-PE-products.pdf>.

* cited by examiner

REMOVABLE CAP WITH SEAL DESIGNED TO BE OPENED BY PIERCING IN A DIAGNOSTIC ANALYZER

CROSS-REFERENCE TO RELATED APPLICATIONS

This application claims priority to U.S. provisional application Ser. No. 62/357,912 filed Jul. 1, 2016, the contents of which is incorporated herein by reference in its entirety.

TECHNOLOGY FIELD

The present invention relates generally to a cap and seal for a container in use in a diagnostic analyzer, and more particularly to container with a removable cap with a conductively bonded seal to conceal a mouth of a reagent container used in a diagnostic analyzer.

BACKGROUND

Caps, in particular injection-molded screw caps, are commonly used for sealing containers, such as bottles. A primary function of caps is to keep a container closed and leak-free until contents of the container are to be used.

Screw caps are known to operate acceptably when installed on containers that are sealed by an induction-sealed membrane. A claw-seal projection inside of such caps may be used to apply pressure to a specific top contact area or inside of a top throat surface of the container. Such cap and container assemblies may include an external sleeve surrounding the cap and container interface. The sleeve may prevent leakage and provide a visual indication of prior access to the container contents.

Other designs incorporate a seal membrane that includes an aluminum foil layer between two polymeric layers. A bottom polymer layer is sealed to an opening of the container by inductive heating of the aluminum foil layer, thereby melting and bonding the bottom polymer layer to the container. The seal serves to protect the contents of the container and form a leak-proof closure of the container. Access to the container contents is performed by removal of the cap and manual peeling or perforation of the induction-sealed membrane. However, when used in an automatic process that requires a high throughput, such as a diagnostic analyzer, manual removal of the cap and peeling/perforation of the membrane is undesirable due to the amount of required operator-incurred time and the opportunity for introducing cross-contaminants.

Thus, there is a need for providing access to contents of a container in an automated manner in a diagnostic analyzer, while reducing possibilities for cross-contamination and spillage.

SUMMARY

Embodiments are directed to a removable cap with a conduction seal closure for sealing an opening of a container.

In an embodiment, an apparatus to cover a reagent container used in a diagnostic analyzer in an in vitro diagnostics (IVD) environment comprises: a cap comprising a sidewall, a top wall with an open access hole on and through the top wall, and a flat upper portion surrounding the open access hole, the cap configured to be attached to a throat of the reagent container, the throat comprising an opening; and a conduction seal for sealing the open access hole of the cap. The conduction seal comprises: a first polymer sealing layer configured to be heat-sealed to the flat upper portion of the cap; an aluminum foil layer arranged on top of the first polymer sealing layer and configured to heat seal the first polymer sealing layer by conductive heating to the flat upper portion of the cap; and a second polymer layer arranged on top of the aluminum foil layer and configured to protect the aluminum foil layer and the first polymer layer. The conduction seal is configured to be opened by a perforation device and hold an opened shape when perforated, while remaining adhered to the flat upper portion of the cap, to provide access to contents of the container via the opened shape, the open access hole of the cap, and the throat opening of the container.

According to another embodiment, an apparatus for storing one or more fluids in a diagnostic analyzer in an in vitro diagnostics (IVD) environment comprises: a container comprising one or more storage portions, each storage portion comprising a throat with a throat sidewall, an opening, and an outer surface of the opening; one or more caps, each of the one or more caps corresponding to a respective one of the one or more storage portions, each cap comprising a sidewall, a top wall with an open access hole on and through the top wall, and a flat upper portion surrounding the open access hole, the cap configured to be attached to the throat of the storage portion of the container; and one or more conduction seals, each of the one or more conduction seals corresponding to a respective one of the one or more caps, for sealing the open access hole of the cap. Each conduction seal comprises: a first polymer sealing layer configured to be heat-sealed to flat upper portion of the cap; an aluminum foil layer arranged on top of the first polymer sealing layer and configured to heat seal the first polymer sealing layer by conductive heating to the flat upper portion of the cap; and a second polymer layer arranged on top of the aluminum foil layer and configured to protect the aluminum foil layer and the first polymer layer. The conduction seal is configured to be opened by a perforation device and hold an opened shape when perforated, while remaining adhered to the flat upper portion of the cap, to provide access to contents of the container via the opened shape, the open access hole of the cap, and the throat opening of the storage portion of the container.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments are directed to a removable cap with a conduction seal closure for sealing an opening of a container. Advantageously, according to embodiments provided herein, the cap with the seal does not need to be removed for a probe to access contents of the container, when used in a diagnostic analyzer, thereby eliminating operator steps of cap removal and/or seal peeling or perforation. However, the cap with the seal can be removed without compromising the integrity of the seal.

According to embodiments, automated opening of the cap and seal combination is provided by puncturing the seal without removal of the cap and seal from the container. The seal advantageously retains its opened shape required for unobstructed, non-contact probe access to contents of the container. Cross-contamination and level sense problems are addressed by prevention of unintended probe contact with surfaces other than the container's contents.

Although embodiments are described with respect to a reagent container for use in a diagnostic or clinical analyzer, the invention is not so limited. The cap and the seal provided herein may be used in any type of environment in which it is desired to open a seal on a container for access to contents contained in the container.

Figure 1:
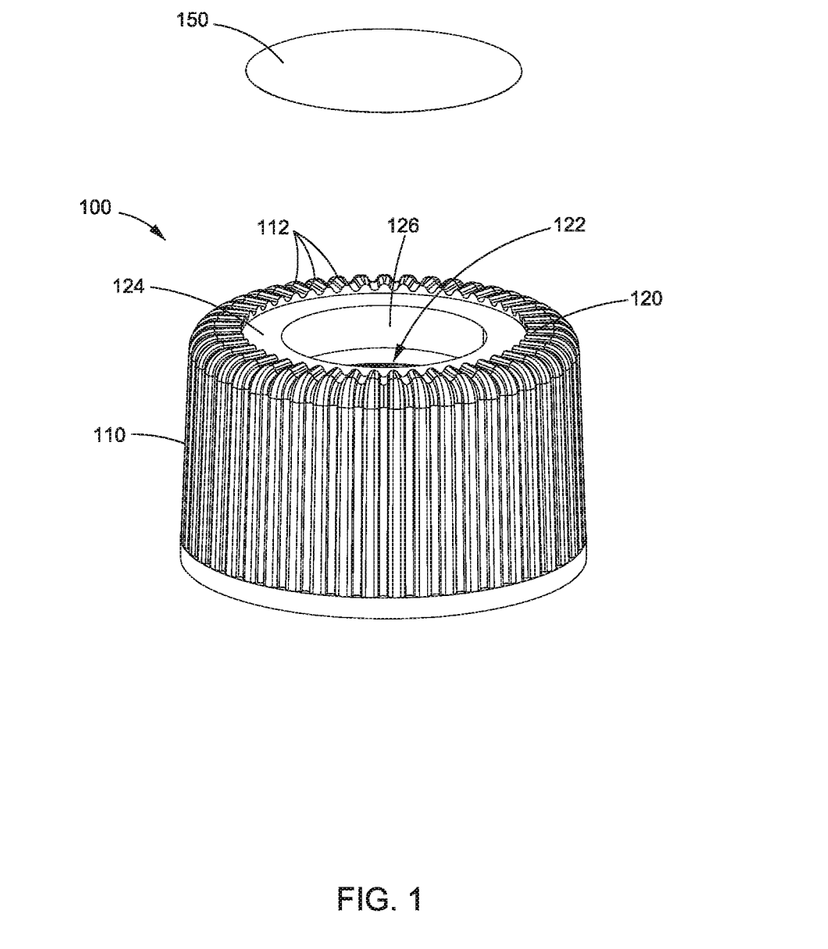
FIG. 1 is a diagram depicting a view of a cap and a seal, according to an embodiment.
Figure 2:
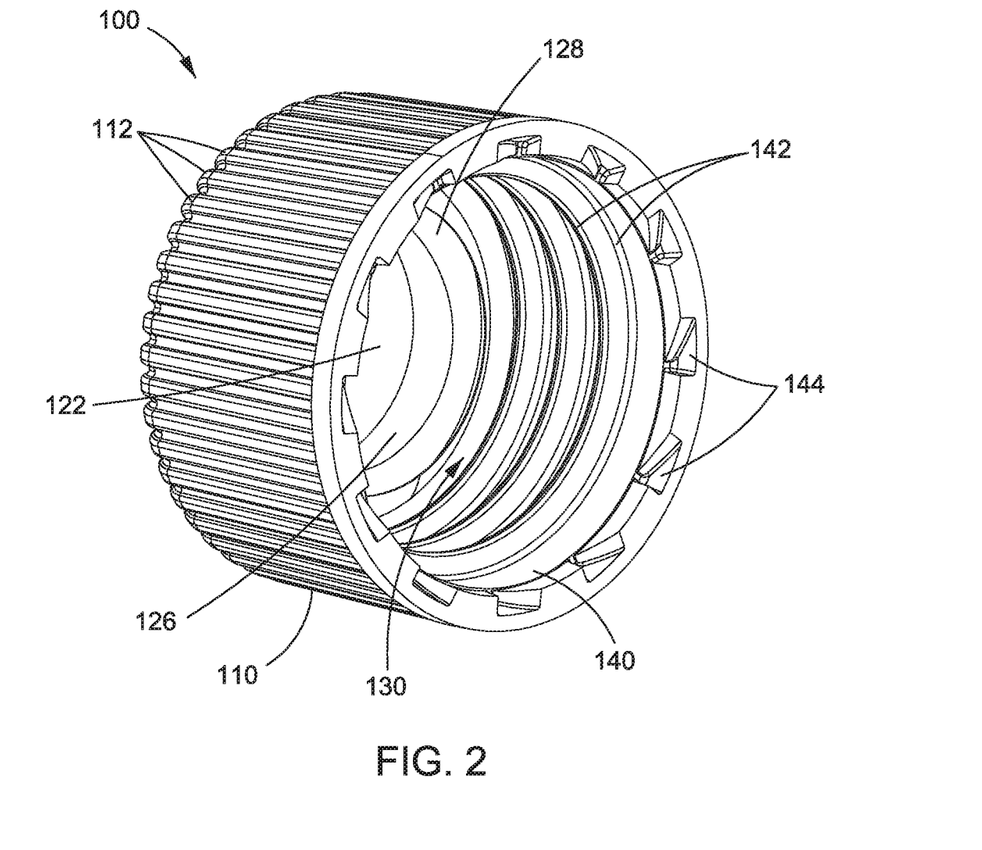
FIG. 2 is a diagram depicting aspects of a cap, according to an embodiment.

With reference to FIGS. 1 and 2, features of a cap 100 are illustrated, according to an embodiment. FIG. 1 also includes illustration of a seal 150, according to an embodiment. FIG. 1 is a perspective view of the cap 100 and the seal 150, and FIG. 2 provides an underside perspective view of the cap 100.

The cap 100 is comprised of a sidewall 110 and a top wall 120. The sidewall 110 and the top wall 120 define an interior portion 130 (see FIG. 2) of the cap 100.

The sidewall 110 and a portion of the top wall 120 may, as shown in the embodiment of FIGS. 1 and 2, have a series of ridges 112 on its outer surface to aid in gripping the cap 100. The cap 100 is not limited to this configuration, and the sidewall 110 and/or the top wall 120 may instead have a smooth outer surface or other surface texture.

With continued reference to FIGS. 1 and 2, an open access hole 122 is formed in and through the top wall 120 of the cap 100. In an embodiment, the open access hole 122 is a center hole in the top wall 120. A portion of the top wall 120 surrounding the open access hole 122 is comprised of an upper flat portion 124 (see FIG. 1), a hole sidewall 126 (see FIGS. 1 and 2), and a claw-type seal 128 (see FIG. 2). In an embodiment, as shown in FIG. 1, the upper flat portion 124 is a recessed portion with respect to a surrounding area of the top wall 120.

As shown in FIG. 2, an internal sidewall 140 of the cap 100 may include threads 142 and/or one or more tabs or 144 for connection of the cap 100 to a container, as described below. The cap 100 is not limited to such a configuration of the internal sidewall 140, and other designs may instead be utilized, such as, for example, an internal sidewall 140 with components for snap-fitting the cap 100 onto a container.

In an embodiment, the cap 100 is formed of polypropylene, such as a high-density polypropylene, or other polymeric material, although the cap 100 is not so limited. In an embodiment, the upper flat portion 124 of the cap 100 is formed of polypropylene, while a remaining portion of the cap 100 may be formed of another material.

As shown in FIG. 1, the seal 150 is of a generally circular shape. The circular shape of the seal 150 is sized to fit within the upper flat portion 124 of the cap 100 to conceal the open access hole 122 of the cap 100. The open access hole 122 and the seal 150 are not limited to a circular shape, and other shapes may be utilized. The seal 150 is sized, according to an embodiment, to conceal the open access hole 122 and a majority (i.e., greater than 50%) portion of the upper flat portion 124 of the cap 100. In an embodiment, the seal 150 is sized to conceal substantially all of the upper flat portion 124 of the cap 100, when sealed thereto, according to embodiments described herein.

Figure 3:
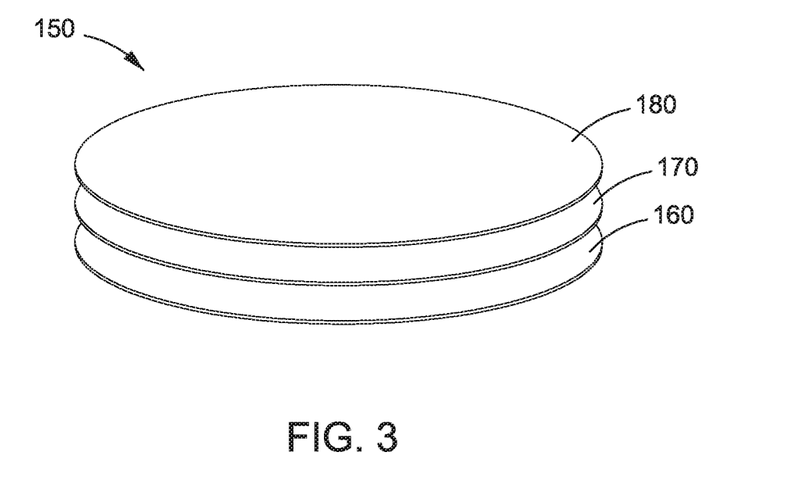
FIG. 3 is a diagram illustrating aspects of a multi-layer seal, according to an embodiment.

FIG. 3 is a diagram illustrating additional aspects of the seal 150, according to an embodiment. The seal 150, according to an embodiment, is comprised of three layers: a first (bottom) polymer sealing layer 160 comprising a heat-sealable polymer capable of being heat-sealed to the upper flat portion 124 of the cap 100; an aluminum foil (middle) layer 170 arranged on top of the first polymer sealing layer 160, comprising aluminum foil to heat seal the first polymer sealing layer 160 by conductive heating of the aluminum; and a second (top) polymer layer 180 arranged on top of the aluminum foil layer 170 configured to protect the aluminum foil layer 170 and the first polymer sealing layer 160.

In an embodiment, the first polymer sealing layer 160 comprises polypropylene, and the second polymer layer 180 comprises polyethylene terephthalate. In an embodiment, the second polymer layer 180 comprising polyethylene terephthalate forms a laminate with the aluminum foil layer 170.

According to embodiments herein, the first polymer sealing layer 160 performs a seal adhesion function by application of heat energy (from conduction heating of the aluminum foil layer 170) and contact pressure to result in a molecular bonding of the two matching material compositions of the polypropylene first polymer sealing layer 160 and the polypropylene cap 100.

According to embodiments herein, the aluminum foil layer 170 performs the following functions: transfer of heat to the polypropylene first polymer sealing layer 160 for molecular thermal seal bonding of the first polymer sealing layer 160 to the upper flat portion 124 of the cap 100; the formable and "memory" shaping characteristics of the aluminum foil layer 170 introduce shape retention capability and thus the ability to "hold open" the first polymer sealing layer 160 and the second polymer layer 180.

According to an embodiment, the second polymer layer 180 is exposed to the external environment surrounding the cap 100, the seal 150, and the container 200, thus providing a protective layer for the first polymer sealing layer 160 and the aluminum foil layer 170 from degradation related to ambient or external exposure to contamination. As such, the second polymer layer 180 is an ambient, vapor, and waterproof seal.

Figure 4:
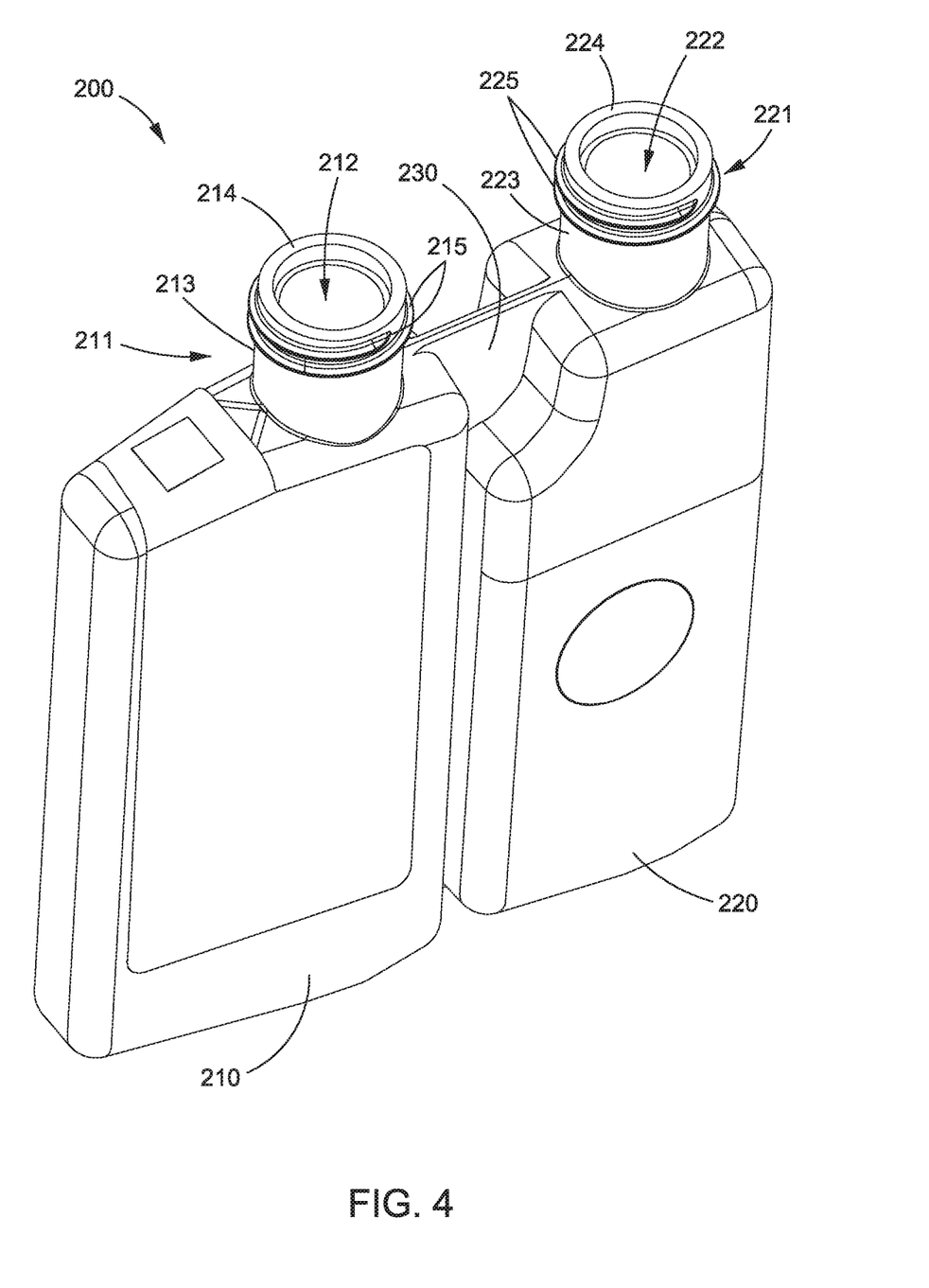
FIG. 4 is a diagram of an exemplary container, according to an embodiment.

FIG. 4 is a diagram of an exemplary container 200 that may be used with the cap 100 with the seal 150. Other types of containers or variations of the container 200 may be used, and the cap 100-seal 150 combination is not limited to use of the exemplary container 200 described herein. Detailed features of an exemplary reagent container are provided in PCT Patent Application Serial No. PCT/US14/019078, the contents of which are hereby included by reference in their entirety herein.

According to an embodiment, as shown in FIG. 4, the container 200 is comprised of two storage portions (or packs) 210, 220 configured to hold fluids (e.g., reagent fluids) or other materials (e.g., powders) for a particular on-board diagnostic test on a diagnostic analyzer, for example. A gripping portion 230 may extend between the two storage packs 210, 220 and is, in an embodiment, a substantially flat surface that may have one or more protrusions or gripping portions provided thereon.

Each storage portion 210, 220 comprises a throat 211, 221, respectively, to which a cap 100 with a seal 150 may be attached, according to embodiments provided herein. The throat 211 comprises an opening 212, a throat sidewall 213, and a top surface 214 of the throat sidewall 213 (i.e., an outer surface of the opening 212). Throat sidewall threads 215 may be formed on the throat sidewall 213 for mating with the threads 142 of the internal sidewall 140 of the cap 100. As noted above, the container 200 and the cap 100 are not limited to the threaded configuration and each may instead have other components or characteristics for mating together the cap 100 and the container 200 (e.g., snap-fit components or the like). The claw-like seal 128 of the cap 100 provides for the cap 100 to act as seal between the top surface of the throat sidewall 213 and the cap 100.

Similar to the throat 211, the throat 221 comprises an opening 222, a throat sidewall 223, and a top surface 224 of the throat sidewall 223 (i.e., an outer surface of the opening 222). Throat sidewall threads 225 may be formed on the throat sidewall 223 for mating with the threads 142 of the internal sidewall 140 of the cap 100.

Of course, the container 200 shown in and described herein with reference to FIG. 4 is purely exemplary and non-limiting to the cap 100 with the seal 150 disclosed herein. In an embodiment, a container to be used with the cap 100-seal 150 combination, according to embodiments provided herein, may have a single storage portion, for example. Moreover, the container 200, or variations thereof, is not required to be used to store reagent fluids for use in a diagnostic analyzer.

Figure 5:
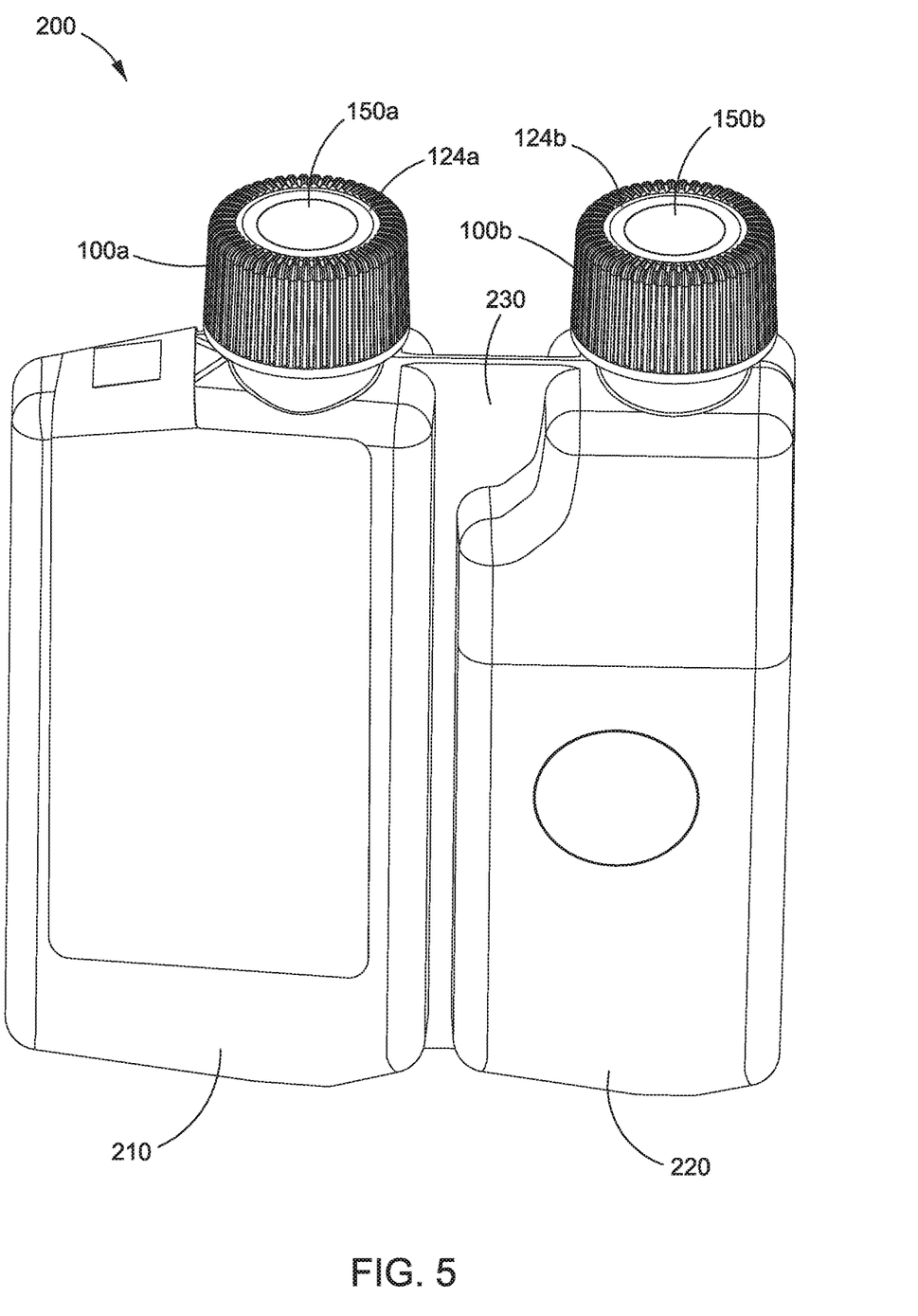
FIG. 5 illustrates an exemplary container to which caps with seals are attached, according to an embodiment.

FIG. 5 depicts an exemplary container 200 with caps and seals 100a-150a, 100b-150b attached to the throat sidewalls 213, 223 to cover the openings 212, 222, respectively, according to an embodiment. As shown in FIG. 5, a portion of the flat upper portion 124a, 124b of each cap 100a, 100b, surrounding the respective seal 150, 150b, is shown.

Figure 6:
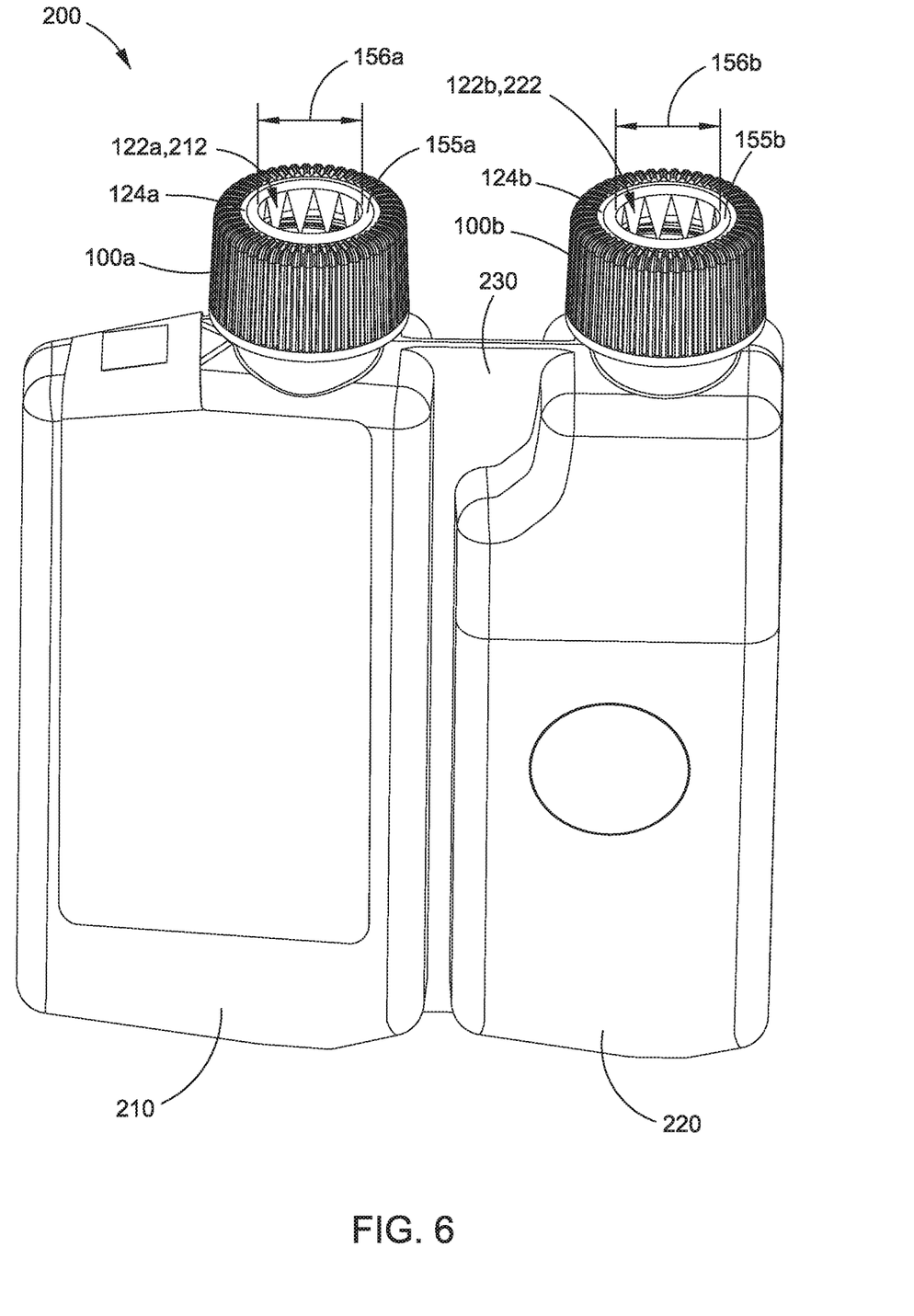
FIG. 6 illustrates an exemplary container to which caps with seals are attached, with the seals punctured, according to an embodiment.

FIG. 6 illustrates an exemplary container 200 with caps 100a, 100b with punctured seals 155a, 155b attached to the throats 211, 221. As shown in FIG. 6, the punctured seals 155a, 155b (seals 150a, 150b punctured via a puncturing tool) provide access via openings 156a, 156b of the punctured seals 155a, 155b to contents of the container 200. As shown, the openings 212, 222 of the container 200 are accessible (i.e., full open access to the contents of the container 200) via the openings 156a, 156b of the punctured seals 155a, 155b through the open access holes 122a, 122b of the caps 100a, 100b. This access is achieved, according to an embodiment, without probe or instrument contact to the punctured seals 155a, 155b.

According to an embodiment, the thermal-induced adhesion (i.e., holding) power of the first polymer sealing layer 160 to the cap 100 is greater than that of the peel force between that of the first layer 160 to second layer 170 and the second layer 170 to the third layer 180.

In an embodiment, a holding power of the first polymer sealing layer 160 is greater than a required shear force to perforate the aluminum foil layer 170 and the second polymer layer 180.

In an embodiment, a melting temperature of the first polymer sealing layer 160 is lower than a melting temperature of the second polymer layer 180.

In an embodiment, a counterpart holding power of the first polymer sealing layer 160 to the cap 100 is obtained by combining force direction and heat applied to the seal 150 by the flat upper portion 124 of the cap 100 during the conductive sealing process of the seal 150 to the cap 100.

In an embodiment, the second polymer layer 180 and the aluminum foil layer 170 have a difference in releasing power compared to the first polymer sealing layer 160 conductively bonded to the upper flat portion 124 of the cap 100, based on the differences in their respective materials.

According to an embodiment, a cap 100 and a seal 150, upon the cap 100 being connected (e.g., screwed) to a container 200 and the seal 150 placed and centered within the upper flat portion 124 of the cap 100, are exposed to a conductive heat source, according to methods known by those of ordinary skill in the art, in which by heating the aluminum foil layer 170, heat is transferred to melt-able layers (i.e., the first polymer sealing layer 160). Heat conduction is such that the attachment of the first polymer sealing layer 160 is contiguous and without void so that the first layer 160 is molecularly bonded by the co-mingling of material from both surfaces (i.e., the upper flat portion 124 of the cap 100 and an underside of the first polymer sealing layer 160). The application of heat to the aluminum foil layer 170 causes the polymer surface (i.e., the first polymer sealing surface 160) of the seal 150 to melt, resulting in molecular bonding of the first polymer sealing layer 160 to the cap 100. Removal of the cap 100 after heat conduction will not void or compromise the sealed surface of the cap 100, and a sealed closure will remain until it is pierced or punctured by a puncturing device. The piercing of the seal 150 by penetration of an opener tool or puncturing device produces an underside curl-shaping of the seal 150 (i.e., punctured seal 155a, 155b and seal opening 156a, 156b as shown in FIG. 6), which remains open due to the tension of the aluminum foil layer 170 of the seal laminate. The piercing or puncturing of the seal 150 may be done by automation, but may also be accomplished manually with a hand-tool used by an operator.

According to embodiments provided herein, the cap 100 acts as a seal by way of the claw-seal contact 128 with the top surfaces 214, 224 of the container throat 211, 211. The top cap surface (i.e., the upper flat portion 124) surrounding the open access hole 122 is used for application of the pressure/heat conducted sealing process of the multi-layered seal 150. The center open access hole 122 in the cap 100 is provided for automatic (pierce-type) seal 150 opening to avail automatic or manual access to the contents of the container 200. According to embodiments provided herein, removal of a contiguous sealed cap (100-150) (e.g., for the addition of additives), access to the container 200 contents, and re-closure of the cap 100 is provided. The common materials between the polymer cap 100 and the first polymer sealing layer 160 enables the cap 100 conduction process to adhere the seal 150 to the cap 100. The cap 100 also, via the open access hole 122, confines the sizing of the piercing tool to the center throat area (i.e., the throat 211, 221) of the container 200. This piercing action introduces an opening "shape retention," which results from the ductile aluminum foil layer 170 perforation impinging on the layers 160, 180 and preserving the projection of the aluminum foil layer 170 into the container throat 211, 221. According to embodiments provided herein, ability to access the internal contents of the container 200 by unscrewing and removal of the cap 100 plus seal 150 combination, re-installation of the cap 100 while the external seal 150 remains intact, and auto-opening by piercing of the seal 150 is provided. While, according to embodiments provided herein, it is unnecessary to penetrate the seal 150, once perforation through the seal 150 is carried out, the aluminum foil layer 170 retains the punctured shape of the opening 156 to avail continued access to the contents of the container 200. The penetration of the seal 150 results in formation and control of the sizing of the access hole 156. Limited only by the size of the open access hole 122, the curled access flanges then become a physical method to retain the opening and prevent probe contact to the seal breakage projections (see FIG. 6). These projections of aluminum maintain the parting of the seal 150 and prevent retraction or re-closure of the seal opening 156, thereby eliminating contact contamination of the probe to aspirations and atomization particulates deposited upon the seal 150. The seal 150 remains attached to the cap 100 even in the event that the cap 100 is subsequently removed. The problem of contact of the access probe to the seal material projections is prevented and the aluminum-polymer seal 150 remains opened and in place on the container 200. Repeated probe access to the container 200, including the emptying of the container 200, is provided without interference of the seal 150 to the accessing probe.

The combination of the cap 100 with the seal 150 to cover a container 200 and provide access to contents contained therein, as disclosed herein, has several advantages: the cap 100 with the seal 150 protects contents from waste and spillage; operator spills are reduced; incidents of contamination are reduced; ease-of-use and operability are increased. Additionally, instrument errors from probe contact with unintended contamination is prevented, resulting in increased reliability and performance to customers. In a diagnostic analyzer embodiment, in which the container 200 is used for reagents, automated opening and preparation of the container seal 150 for a reagent probe adds value to the instrument performance during reagent probe single or full cycle loading by forming a large access target free of seal obstruction (i.e., the punctured seal opening 156a, 156b). Non-utilization hours observed from probe contact with seal material is eliminated. Customer profits are increased due to the increased reliability of reagent probe access and elimination of current extensive operator time.

Figure 7:
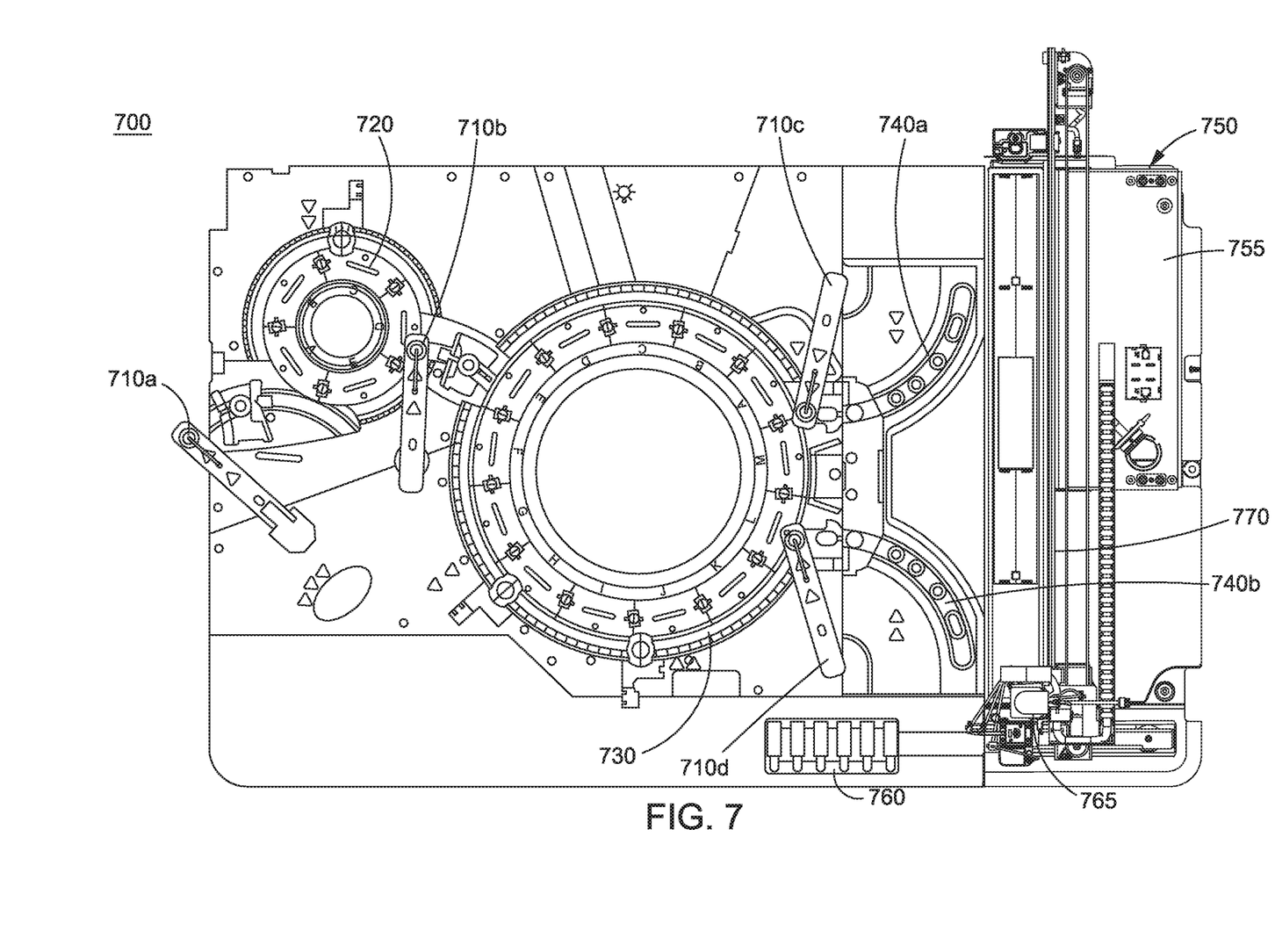
FIG. 7 is a layout of an example system architecture within which embodiments of the invention may be used, according to an embodiment.

FIG. 7 provides a layout of an example system architecture 700 within which embodiments of the invention may be implemented, according to an embodiment. Shown in FIG. 7 are various transfer arms 710 (710a, 710b, 710c, and 710d) with respective probes; a diluting turntable 720 including a plurality of diluting containers arranged in one or more diluting rings; a reaction turntable 730 including a plurality of reaction containers arranged in one or more reaction rings; and reagent storage areas 740a and 740b dedicated to storage and supply of a respective reagent, each reagent storage area 740a and 740b including space for a plurality of reagent containers 200. In operation, transfer arm 710a and its respective probe may operate to transfer sample from an access position to one or more diluting containers on the diluting turntable 720 to create a dilution therein. Transfer arm 710b and its respective probe may operate to transfer dilution from a diluting container to a reaction container on the reaction turntable 730. Transfer arms 710c and 710d and their respective probes may operate to transfer a reagent from reagent storage area 740a and 740b, respectively, to a reaction container on the reaction turntable 730. The various transfers occur by use of a pumping mechanism (not shown), such as a displacement pump, for example, attached to the transfer arms 710. Additionally, the system architecture 700 includes one or more controllers (not shown) for controlling operation of the various components, including the transfer arms 710, the probes, and the turntables.

Also included in the system architecture 700 is a reagent handling system 750 for transferring one or more of the containers 200 to and/or from the reagent storage areas 740a and 740b. The reagent handling system 750, according to an embodiment, includes a reagent server module 755, which is, in an embodiment, a refrigerated storage enclosure comprising one or more indexing rings for storing reagent containers 200.

A tray 760 is configured to hold one or more containers 200 for transfer to and from the reagent server module 755. The tray 760 is accessible to an operator for manual loading and unloading of containers 200 to and from the tray 760, which may move on a track.

A gripper assembly 765, in an embodiment, is provided to automatically transfer containers 200 (with caps 100 and seals 150, according to embodiments disclosed herein) between the tray 760 and the reagent server module 755. The gripper assembly 765 moves along a horizontal transfer arm 770 while gripping a container 200 to transfer the container 200. In an embodiment, the gripper assembly 765 includes a pair of gripper fingers that are oriented vertically and opposite one another for gripping a portion of a container 200 and for puncturing or piercing a seal 150 of a cap 100 attached to a container 200 without removal of the cap 100 with the seal 150.

The system architecture 700 of FIG. 7 and the accompanying description are purely exemplary and non-limiting to the cap 100 and the seal 150 disclosed herein. The system architecture 700 is just one example system in which the cap 100 and the seal 150 may be used.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. An apparatus to cover a reagent container used in a diagnostic analyzer in an in vitro diagnostics (IVD) environment, the apparatus comprising:
 a cap comprising a sidewall, a top wall with an open access hole on and through the top wall, and a flat upper portion surrounding the open access hole, the cap configured to be attached to a throat of the reagent container, the throat comprising an opening; and
 a conduction seal for sealing the open access hole of the cap, the conduction seal comprising:
  a first polymer sealing layer configured to be heat-sealed to the flat upper portion of the cap;
  an aluminum foil layer arranged on top of the first polymer sealing layer and configured to heat seal the first polymer sealing layer by conductive heating to the flat upper portion of the cap; and
  a second polymer layer arranged on top of the aluminum foil layer and configured to protect the aluminum foil layer and the first polymer sealing layer;
 wherein the conduction seal is configured to be opened by a perforation device and hold an opened shape when perforated, while remaining adhered to the flat upper portion of the cap, to provide access to contents of the container via the opened shape, the open access hole of the cap, and the throat opening of the container, and a thermal-induced adhesion power of the first polymer sealing layer to the flat upper portion of the cap is greater than that of a peel force between that of the first polymer sealing layer to the aluminum foil layer and the aluminum foil layer to the second polymer layer.

2. The apparatus of claim 1, wherein the aluminum foil layer transfers conductive heat to the first polymer sealing layer and the second polymer layer for molecular thermal seal bonding of the first polymer sealing layer to the flat upper portion of the cap; and wherein physical properties of the aluminum foil layer provide for the first polymer sealing layer and the second polymer layer shape to retain the opened shape when perforated.

3. The apparatus of claim 2, wherein the first polymer sealing layer and the cap are comprised of a same material.

4. The apparatus of claim 1, wherein the first polymer sealing layer comprises polypropylene.

5. The apparatus of claim 1, wherein the second polymer layer comprises polyethylene terephthalate.

6. The apparatus of claim 1, wherein the open access hole comprises a hole sidewall and a claw-type seal within an interior portion of the cap, wherein the claw-type seal provides contact pressure with the throat opening of the container to seal the cap to the container.

7. The apparatus of claim 1, wherein a holding power of the first polymer sealing layer is greater than a shear force required to perforate the aluminum foil layer and the second polymer layer.

8. The apparatus of claim 1, wherein the second polymer layer is comprised of a dissimilar material to the cap, wherein the second polymer layer and the aluminum foil layer have a difference in releasing power compared to the first polymer sealing layer to the cap based on the differences in their respective materials.

9. The apparatus of claim 1, wherein a melting temperature of the first polymer sealing layer is lower than a melting temperature of the second polymer layer.

10. The apparatus of claim 1, wherein a melting temperature of the first polymer sealing layer is lower than a melting temperature of the second polymer layer.

11. An apparatus for storing one or more fluids in a diagnostic analyzer in an in vitro diagnostics (IVD) environment, the apparatus comprising:

a container comprising one or more storage portions, each storage portion comprising a throat with a throat sidewall, an opening, and an outer surface of the opening;

one or more caps, each of the one or more caps corresponding to a respective one of the one or more storage portions, each cap comprising a sidewall, a top wall with an open access hole on and through the top wall, and a flat upper portion surrounding the open access hole, the cap configured to be attached to the throat of the storage portion of the container; and one or more conduction seals, each of the one or more conduction seals corresponding to a respective one of the one or more caps, for sealing the open access hole of the cap, each conduction seal comprising:

a first polymer sealing layer configured to be heat-sealed to flat upper portion of the cap;

an aluminum foil layer arranged on top of the first polymer sealing layer and configured to heat seal the first polymer sealing layer by conductive heating to the flat upper portion of the cap; and a second polymer layer arranged on top of the aluminum foil layer and configured to protect the aluminum foil layer and the first polymer sealing layer;

wherein the conduction seal is configured to be opened by a perforation device and hold an opened shape when perforated, while remaining adhered to the flat upper portion of the cap, to provide access to contents of the container via the opened shape, the open access hole of the cap, and the throat opening of the storage portion of the container, and a thermal-induced adhesion power of the first polymer sealing layer to the flat upper portion of the cap is greater than that of a peel force between that of the first polymer sealing layer to the aluminum foil layer and the aluminum foil layer to the second polymer layer.

12. The apparatus of claim 11, wherein the throat further comprises throat sidewall threads formed on the throat sidewall, wherein the cap further comprises cap threads formed on an internal sidewall thereof, wherein the throat sidewall threads and the cap threads are configured to mate with one another to attach the cap to the throat of the storage portion of the container.

13. The apparatus of claim 11, wherein the aluminum foil layer transfers conductive heat to the first polymer sealing layer and the second polymer layer for molecular thermal seal bonding of the first polymer sealing layer to the flat upper portion of the cap; and wherein physical properties of the aluminum foil layer provide for the first polymer sealing layer and the second polymer layer shape to retain the opened shape when perforated.

14. The apparatus of claim 13, wherein the first polymer sealing layer and the cap are comprised of a same material.

15. The apparatus of claim 11, wherein the first polymer sealing layer comprises polypropylene, and wherein the second polymer layer comprises polyethylene terephthalate.

16. The apparatus of claim 11, wherein the open access hole comprises a hole sidewall and a claw-type seal within an interior portion of the cap, wherein the claw-type seal provides contact pressure with the throat opening of the storage portion of the container to seal the cap and the container.

17. The apparatus of claim 11, wherein a holding power of the first polymer sealing layer is greater than a shear force required to perforate the aluminum foil layer and the second polymer layer.

18. The apparatus of claim 11, wherein the second polymer layer is comprised of a dissimilar material to the cap, wherein the second polymer layer and the aluminum foil layer have a difference in releasing power compared to the first polymer sealing layer to the cap based on the differences in their respective materials.

* * * * *